(12) United States Patent
Greenspan

(10) Patent No.: US 10,437,769 B2
(45) Date of Patent: Oct. 8, 2019

(54) TRANSITION-MINIMIZED LOW SPEED DATA TRANSFER

(71) Applicant: Intel Corporation, Santa Clara, CA (US)

(72) Inventor: Daniel Greenspan, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 15/032,488

(22) PCT Filed: Dec. 26, 2013

(86) PCT No.: PCT/US2013/077872
§ 371 (c)(1),
(2) Date: Apr. 27, 2016

(87) PCT Pub. No.: WO2015/099743
PCT Pub. Date: Jul. 2, 2015

(65) Prior Publication Data
US 2016/0299869 A1   Oct. 13, 2016

(51) Int. Cl.
*G06F 13/42* (2006.01)
*G06F 13/36* (2006.01)

(52) U.S. Cl.
CPC .............. *G06F 13/42* (2013.01); *G06F 13/36* (2013.01); *G06F 13/4243* (2013.01); *G06F 2213/0038* (2013.01)

(58) Field of Classification Search
None
See application file for complete search history.

(56) References Cited

U.S. PATENT DOCUMENTS

| 5,511,212 A * | 4/1996 | Rockoff ................... G06F 1/04 712/22 |
| 5,928,346 A | 7/1999 | Johnson et al. |
| 6,181,609 B1 * | 1/2001 | Muraoka .............. G11C 7/1051 365/189.05 |
| 6,393,074 B1 | 5/2002 | Mandyam et al. |

(Continued)

FOREIGN PATENT DOCUMENTS

| CN | 1607785 A | 4/2005 |
| JP | 2005020056 A | 1/2005 |

(Continued)

OTHER PUBLICATIONS

International Search Report and Written Opinion for International Application PCT/US2013/077872 filed Dec. 26, 2013 dated Sep. 25, 2014, 10 pages.

(Continued)

*Primary Examiner* — Henry Tsai
*Assistant Examiner* — Aurangzeb Hassan
(74) *Attorney, Agent, or Firm* — International IP Law Group, P.L.L.C.

(57) ABSTRACT

A method of transition minimized low speed data transfer is described herein. In an embodiment, a data rate of a set data to be transmitted on a data bus is determined. A one hot value is encoded on the data bus in response to a low data rate. An XOR operation is performed with a previous state of the data bus and the encoded one hot value. Additionally, a resulting value of the XOR operation is driven onto the data bus.

23 Claims, 6 Drawing Sheets

(56) References Cited

U.S. PATENT DOCUMENTS

| | | | |
|---|---|---|---|
| 6,584,535 B1* | 6/2003 | Ouellet | H04L 47/10 370/223 |
| 6,791,705 B1 | 9/2004 | Sakamoto | |
| 7,170,431 B2* | 1/2007 | Jung | H03M 7/18 341/50 |
| 7,397,792 B1* | 7/2008 | Beshai | H04L 12/56 370/355 |
| 8,995,912 B2* | 3/2015 | Rofougaran | H01L 25/00 333/109 |
| 2004/0122888 A1* | 6/2004 | Carmichael | H04L 12/2801 709/200 |
| 2006/0206644 A1 | 9/2006 | Tsai et al. | |
| 2009/0245000 A1* | 10/2009 | Anzou | G11C 29/02 365/201 |
| 2010/0174936 A1 | 7/2010 | Hill et al. | |
| 2011/0284727 A1* | 11/2011 | Konishi | H04N 5/3765 250/214 P |
| 2012/0229310 A1 | 9/2012 | Chang | |
| 2016/0301414 A1* | 10/2016 | Olbrich | G06F 17/5054 |

FOREIGN PATENT DOCUMENTS

| | | |
|---|---|---|
| JP | 2009245553 A | 10/2009 |
| JP | 2013110525 A | 6/2013 |
| KR | 100574767 B1 | 4/2006 |
| WO | 2009154797 A2 | 12/2009 |
| WO | 2013081683 A1 | 6/2013 |

OTHER PUBLICATIONS

Chinese Search Report, Chinese Application No. 201380081224.3, dated Mar. 16, 2018, 1 page.
Supplementary European Search Report, EP Application No. EP13900545, dated Aug. 3, 2017, 2 pages.

* cited by examiner

300

400

TRANSITION-MINIMIZED LOW SPEED DATA TRANSFER

CROSS REFERENCE TO RELATED APPLICATIONS

Pursuant to 35 U.S.C. § 371, this application is the United States National Stage Application of International Patent Application No. PCT/US2013/077872, filed on Dec. 26, 2013, the contents of which are incorporated by reference as if set forth in their entirety herein.

TECHNICAL FIELD

The present techniques generally relate to communication systems. Specifically, the present techniques relate to transition minimized low speed data transfer.

BACKGROUND ART

Electronic devices frequently chips that integrate the components of the electronic device into a single silicon chip. In some cases, several silicon chips may be integrated into a single package. In some cases, packages are connected through a circuit board. Radio frequency (RF) functionality for a WiFi solution may be integrated onto a portion of the silicon by having a discrete monolithic RF portion connected by an area of printed circuit board (PCB). A high speed data bus may be used for data transfer between the discrete RF portion and other portions of the chip, package, or board.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
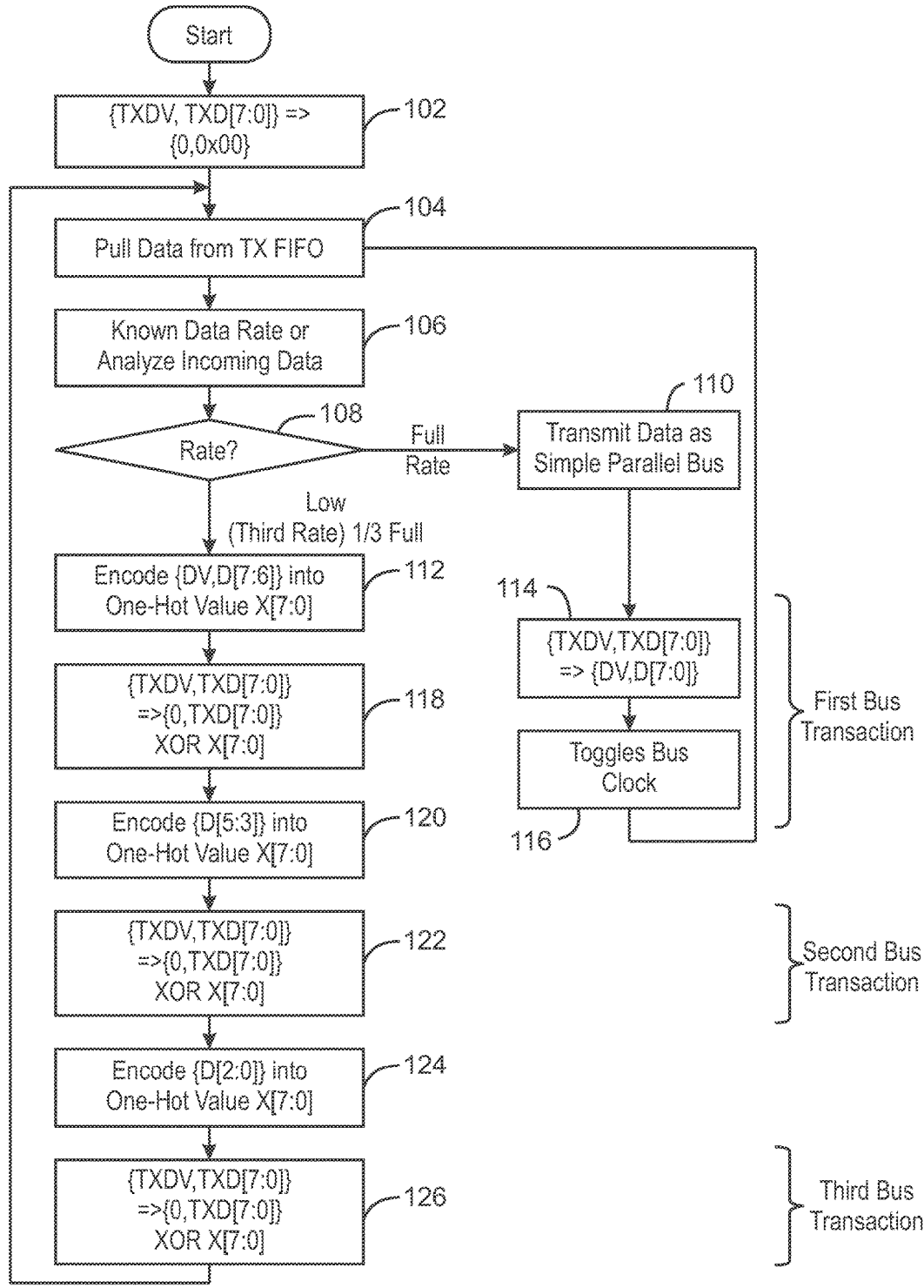
FIG. 1 is an illustration of an encoding scheme at a transmitter.

As greater silicon integration occurs, digital elements of a WiFi solution may be integrated into a system-on-chip (SoC) or platform controller hub (PCH). As discussed above, a discrete monolithic RF portion may be connected by a few inches of PCB. In some cases, a parallel data bus may be used for data transfer, as the bursty nature of data may not lend itself well to serializer/deserializer (SERDES) style connections. An interconnect may carry occasional bursts of digitized RF samples, at both full and low data rates depending on parameters such as WiFi data rate and antenna diversity. A significant amount of power is consumed when driving the interconnect interface for full speed data transfer. In an Always-On-Always-Connected scenario where the interconnect data rate is significantly lower the interconnect capacity, the power used by the interface may have a critical impact on standby battery life. In other words, significant amounts of energy may be used to transmit data using a full speed data interface, when the data rate itself is low speed.

Embodiments described herein enable transition minimized low speed data transfer. In an embodiment, a data rate of a set data to be transmitted on a data bus is determined. A one hot value is encoded on the data bus in response to a low data rate. An XOR operation is performed with a previous state of the data bus and the one hot value. Additionally, the encoded data is transmitted using the data bus.

In this manner, a channel encoding scheme has been devised that enables a chunk of data to be transmitted on an interface using less energy. This scheme is backwards-compatible and can co-exist with any standard transmission scheme, and can be selected automatically and transparently when low data rates are in use. In general, the encoding scheme of "one-hot-XOR" is inefficient in terms of channel capacity, however, the "one-hot-XOR" is 40% more energy efficient as it carries multiple data bit transitions with a single channel binary bit transition and obviates the need for a channel clock.

This technique can be applied to on-chip interfaces, such as an Intel on chip system fabric (IOSF-SB). It offers savings both in cases where the data bus carries the link clock and in cases where an independent clock trunk is present. Moreover, the present techniques may be applied multi-wire buses between components on a PCB or package. Furthermore, the present techniques are relevant to processes and buses where leakage losses on data lines is significantly lower than charging/discharging energies.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present technique. It will be apparent, however, to one skilled in the art that these specific details need not be employed to practice the present technique. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present technique.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. The disclosed embodiments may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations. Likewise, the apparatus' and methods are not limited to electrical signaling techniques, but could also be applied to mechanical, electro-mechanical, optic, radio-frequency, or other data transmission mechanisms. It may be further applied to storage mechanism such as phase-change memories, allowing a greater efficiency in terms of bits stored per change.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present technique described herein.

For purposes of explanation, examples described herein use a source synchronous DDR parallel data bus having eight data signals, one data valid signal, and a clock signal. However, the present techniques may be used with a high speed data bus of any width. As used in the following examples: D, DV are the data and data valid signals on the bus; TXD, TXDV are the data and data valid signal to be transmitted by the transmitter; X represents a temporary variable used locally at transmitter and receiver; CD represents captured (asynchronously latched) data at the receiver; LRXD, LRXDV represent data and data valid values captured by the receiver using the low data rate detection path; and FRXD, FRXDV represent data and data valid values captured by the receiver using the full rate detection path.

With a high speed data bus, the coding scheme may be changed to run the data bus more efficiently. A one hot scheme and XOR operation may be used to change the coding scheme. In a one hot scheme, only one bit of a plurality of bits is switched on at a time. The XOR operation enables a single bit of a plurality of bits to be changed in order to transmit a value. For example, if bit five is high, and then turned off, that indicates a data token of "five" has been transmitted. However, if bit five is high, then the value of bit two changes, that indicates a data token of "two" has been transmitted.

The coding scheme described herein has several benefits. In a binary scheme, up to 3 data bits may be changed. Changing each bit consumes energy. For example, if a two (010 in binary) is transmitted in a binary scheme (010), and subsequently a five (101 in binary) is transmitted, all three signals or wires are changed. Thus, triple the energy costs are used to change each signal when compared to a one hot XOR coding scheme, where a single signal is changed to send a value. Additionally, it is difficult to determine if each bit is changed at the same time using a binary scheme. To remedy this, a clock signal is generally required to indicate when the data is valid. In a one hot XOR coding scheme, the single change is used to determine the value, and a clock signal is not required to coordinate the transitions of several bits. Thus, energy is saved with respect to the clock signal.

An additional benefit of the coding scheme relates to the energy required to drive a bus data bit high. At low-speed, transmission never involves more than a single bus data bit changing level, and thus never requires more than a single data bit charging energy at any instant. By comparison, whenever the first piece of data to be transmitted in a burst is of decimal value 255 (binary value 11111111), existing and full-speed schemes based on the example above may require the charging of all 8 data bits, the DV bit, and the clock at a single instant. Given that at low-data rates, the coding scheme has one tenth of the instantaneous energy requirement of the regular scheme, additional system and chip power savings may be realized due to the resulting lower noise and voltage drops.

FIG. 1 is an illustration of an encoding scheme 100 for a transmitter. In embodiments, the transmitter is connected to a source synchronous DDR parallel data bus having eight data signals, one data valid signal, and a clock signal. Although a particular data bus is described, the present techniques may be used with any data bus of any width of two bits or more. At block 102, all signals on the data bus are set to zero. At block 104, transmission data is pulled from a first in, first out (FIFO) buffer. At block 106, the data rate is found. In some cases, the data rate is known, or the data rate may be found by analyzing the incoming data to determine the data rate. The amount of data in the FIFO buffer may also be used as an indication of the necessary data rate.

At block 108, it is determined if the data rate is at a full data rate or a low data rate. In some cases, full rate data will use all nine signals of the data bus to send the transmission data. The low rate data will use less than the full capacity of the data bus to transmit data, and can be transmitted at a low data rate using a portion of the data bus, such as a third of the data bus capacity. The actual ratio between low and full-speed rates is a function of the number of data lines used. If the data rate is a full rate, process flow continues to block 110. If the data rate is a low rate process flow continues to block 112.

At block 110, the data is transmitted using a parallel bus. The data is transmitted at full speed using the full width of the data bus. At block 114, the data valid signal is asserted along with the data value signals corresponding to the data value transmitted. At block 116, the bus clock is toggled. The bus clock is toggled to indicate completion of the entire data transmission at block 114. Process flow returns to block 104 for subsequent data transmission.

At block 112, low rate data transmission begins on a subset of the FIFO data by encoding a first portion or group of the data for transmission into a one hot XOR scheme. In particular, for an 8-bit parallel data bus with a data valid signal, the first group includes a group data valid signal (DV) along with two bits: D7 and D6, to encode into a one-hot value X. At block 118, the one hot value is XOR'ed with the previous value that had been driven on the data bus. If this is the first data transmission, the previous value on driven on the data bus may be zero. If the present transmission is not the first data transmission, then the previous value of the data bus may have any value. In particular, for an 8-bit parallel data bus with a data valid signal, only a subset of the data bus is used in that the TXDV and bus clock signals are not involved in low rate data transmission.

At block 120, the next group of data is encoded into a one hot value, or one hot XOR. In particular, for this 8-bit parallel data bus with a data valid signal mentioned above, the next group includes three bits: D5, D4, and D3, to encode into a new one-hot value for X. At block 122, this new one hot value is XOR'ed with the previous value that had been driven on the data bus.

At block 124, the final group of data is encoded into a one hot value. In particular, for this 8-bit parallel data bus with a data valid signal mentioned above, the final group includes three bits: D2, D1, and D0, to encode into a third one-hot value for X. At block 126, this third one-hot value is XOR'ed with the previous value that had been driven on the data bus. By using the one-hot data scheme, a clock signal is not required to indicate the complete transmission of data. Since a single line of data is transmitted, the transmission is complete when the one hot value is XOR'ed with the previous value on the data bus. Process flow then returns to block 104 for additional data transmission.

For a given transmitter internal clock, while at the full speed rate, the data bus in this example can send 9 bits, with multiple changes happening and the bus clock toggling at the transmitter internal clock rate. At a low speed as described above, a single change occurs at the same rate (the bus clock does not actually toggle), and 3 bits of data are sent with this change. As a result, 3 transmitter internal clock cycles are used to send 9 bits of data that can be sent using a single transmitter internal clock cycle at the full speed rate. Accordingly, the present techniques use less energy to send a set amount of data, but can take longer to transmit that data.

Figure 2A:
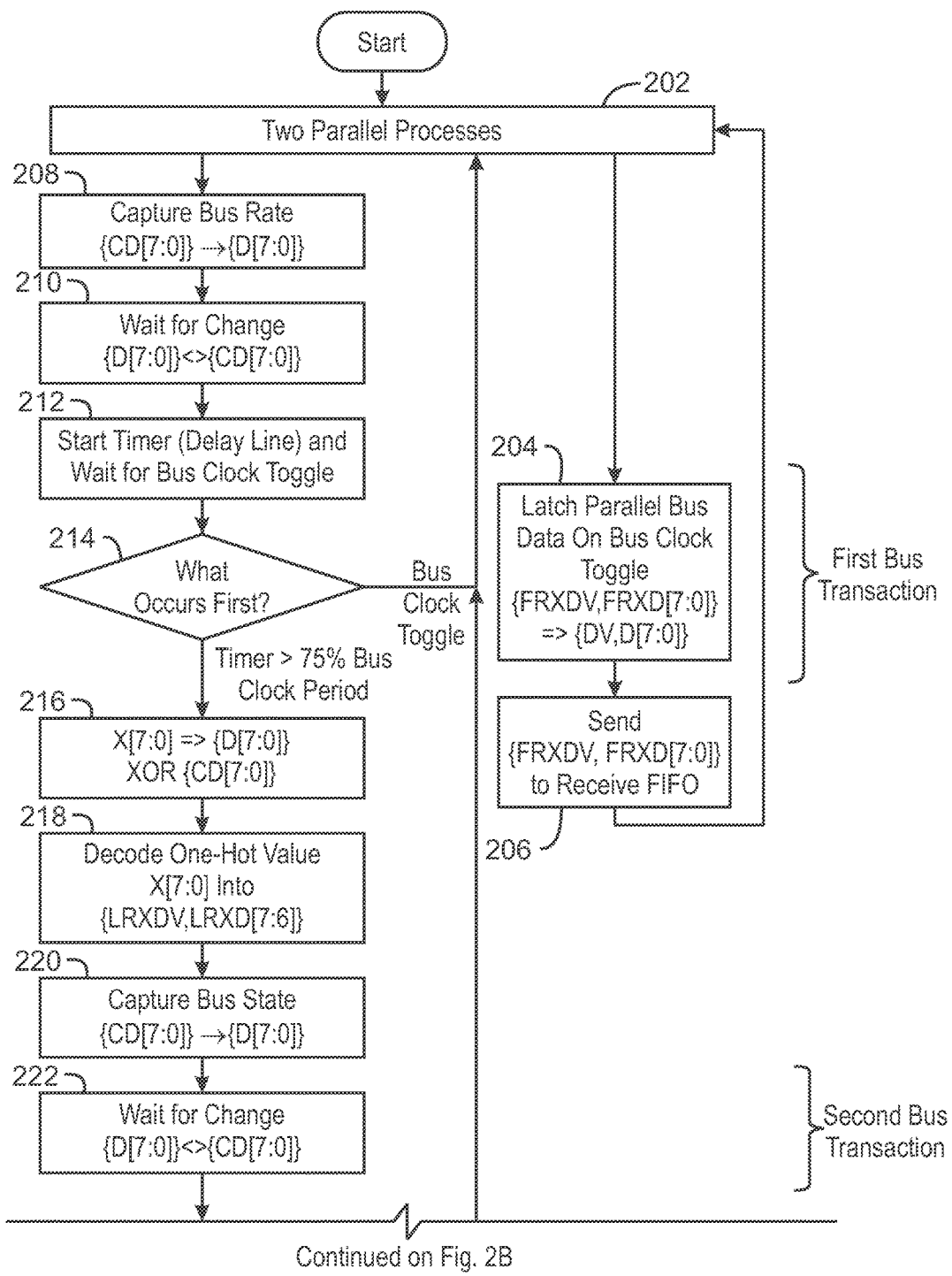
FIGS. 2A and 2B are an illustration of a decoding scheme at a receiver.
Figure 2B:
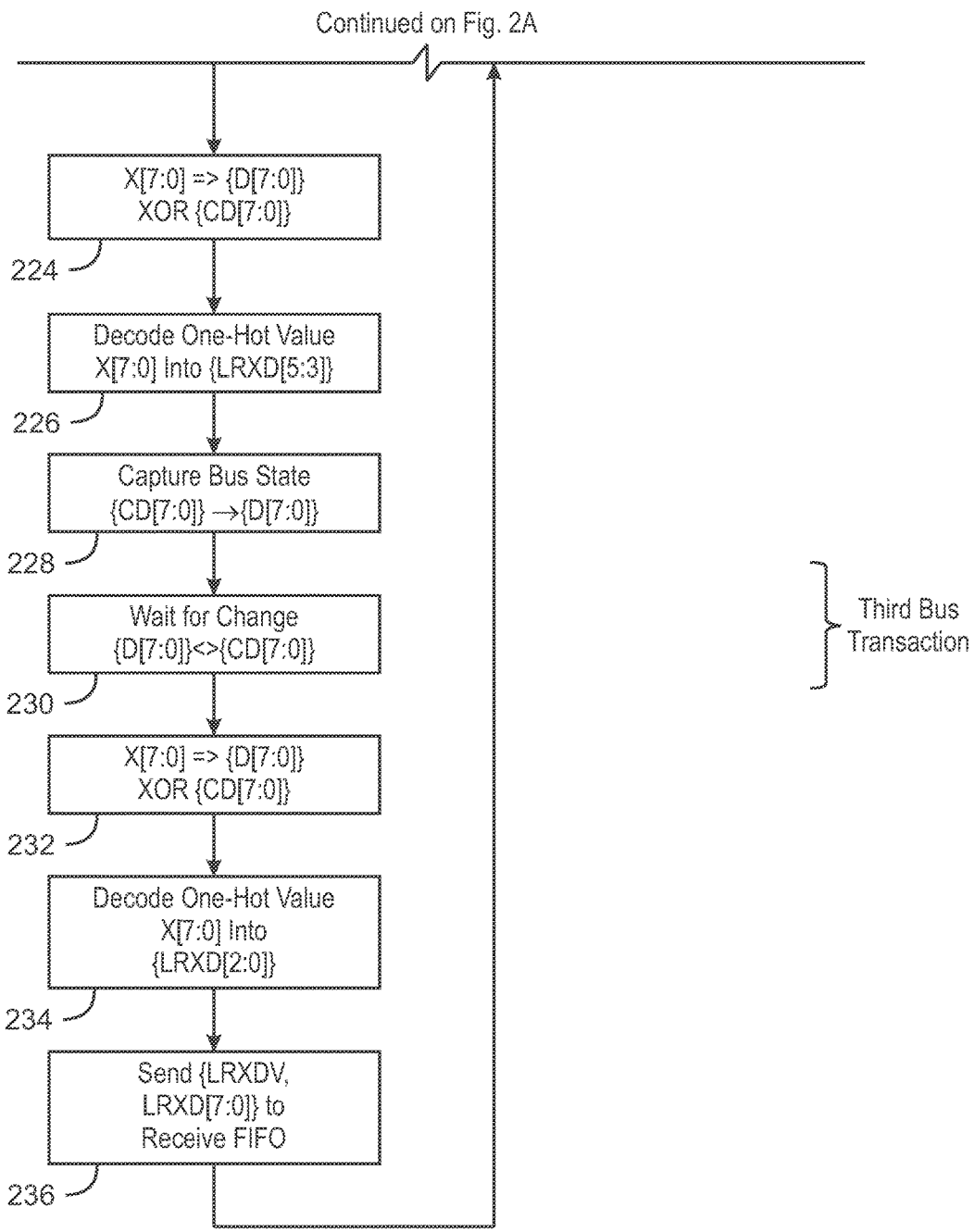

FIGS. 2A and 2B are an illustration of a decoding scheme 200 at a receiver using a one hot XOR scheme. At block 202, two parallel processes for decoding are running, a full rate decoding scheme and a half rate decoding scheme. At block 204, the full rate decoding scheme begins by latching the parallel bus data on the bus clock toggle. In this manner, the first bus transaction is not complete until a toggle of the clock signal. At block 206, the received data is sent to a receiving FIFO buffer. Process flow then returns to block 204 to wait on the next set of data.

The half rate process begins at block 208, where the bus state is captured. In some implementations, the data on the bus is asynchronously latched at the receiver. In some implementations, an XOR of all the data signals into a single bit may be used to recreate the bus clock. In some implementations, the receiver may operate on its own internal clock that is at a frequency suitable fast to capture the changes on the data bus. At block 210, the receiver waits for change on the data bus. At block 212, a timer is started, and the receiver waits for a clock bus toggle. In some cases, the receiver waits for a clock bus toggle to determine whether low-speed or high-speed data is being sent. In the low speed mode, the bus clock will not toggle, and thus low-speed mode is detected if the data bus changes without an accompanying bus clock toggle some short time later.

At block 214, it is determined if a bus toggle occurs or if the timer has reached greater than 75% of the bus clock toggle period. If the bus toggle occurs first, it may be deemed that full-speed data is present and the low-speed receiver is not involved in this piece of bus data. Process flow returns to block 208 so that the receiver may prepare for a new set of data from the bus. If the timer is greater than 75% of the bus clock period, process flow continues to block 216.

At block 216, the asynchronously latched data is XOR'ed with the previous value of the data bus to give the one-hot value that was encoded by the transmitter. At block 218, the one-hot value is decoded into the data and data valid values captured by the receiver using the low data rate detection path. In the example with an 8-bit parallel data bus with a data valid signal, the first group includes a group data valid signal captured by the receiver (LRXDV) along with two data bits captured at the receiver: LRXD7 and LRXD6 are decoded from the one-hot value X. At block 220, the present bus state is captured so that it can be used in decoding the next group of data. At block 222, the receiver waits for change on the data bus by comparing the current bus state with the previously captured bus state.

When a change in the data bus occurs, at block 224, the asynchronously latched data is XOR'ed with the previous value of the data bus. At block 226, the one-hot value from the XOR'ed data is decoded into the next group of data values captured by the receiver using the low data rate detection path. In the example with an 8-bit parallel data bus with a data valid signal, the next group includes three data bits captured at the receiver: LRXD5, LRXD4, and LRXD3 are decoded from the new one-hot value X. At block 228, the present bus state is captured so that it can be used in decoding the next group of data. At block 230, the receiver waits for change on the data bus by comparing the current bus state with the previously captured bus state.

When a change in the data bus occurs, at block 232, the asynchronously latched data is XOR'ed with the previous value of the data bus. At block 234, the one-hot value from the XOR'ed data is decoded into the next group of data values captured by the receiver using the low data rate detection path. In the example with an 8-bit parallel data bus with a data valid signal, the next group includes three data bits captured at the receiver: LRXD2, LRXD1, and LRXD0 are decoded from the third one-hot value X. At block 226, entire group of received data is sent to a receiving FIFO buffer. Specifically, each of the LRXDV, LRXD7, LRXD6, LRXD5, LRXD4, LRXD3, LRXD2, LRXD1, and LRXD0, is sent to a buffer. Process flow then returns to block 208 to obtain the next set of data.

In the receiver example of FIGS. 2A and 2B, separate paths decode the incoming data. The low rate path will identify cases only where a change in the data bus D is not followed by a clock toggle. The full rate path identified cases where a change (or even no change) is followed by a clock toggles. The paths operate mutually exclusively, each capable to sending data to the receiving FIFO buffer. They may be combined into a more optimal implementation.

However some previous techniques result in a linear drop in interconnect power in direct relationship to the drop in data rate. Moreover, the energy required to send each data bit does not decrease with previous techniques. The present techniques described herein enable a better-than-linear drop in interconnect power as data rate drops. For example, when one kilobyte of data is sent at a reduced rate over the interconnect, the energy required for transmission would be only 60% of the energy required were the packet sent at full rate. By comparison, typical techniques such as scaling down the interconnect rate by reducing its clock speed or throttling the clock do not reduce the energy required to send a kilobyte of data, which will remain largely independent of the chosen interconnect data rate for that packet.

In some cases, other alternative, existing solutions may involve reducing the biasing or termination at lower data rates. These solutions can give a better-than-linear saving in power as the data rate drops. However, such techniques provide savings related to peripheral bus functions (such as input buffers) and offer limited scope for saving the energy required to charge the bus itself. Such techniques are generally unable to provide the switch between low-speed and full-speed data rates at anything near the byte granularity of the technique presented.

In some cases, the voltage swing at lower data rates may be reduced. However, most cases where interface voltage swings have been reduced over time have been to allow higher bus speeds, as IO slew rate is often the limiting factor to higher speed operation. These cases include USB and SDCard. With the input/output (I/O) slew rate as a limiting factor, it is likely that there is limited benefit to be gained by trying to further reduce swings at lower speeds, as noise and similar effects remain constant.

Figure 3:
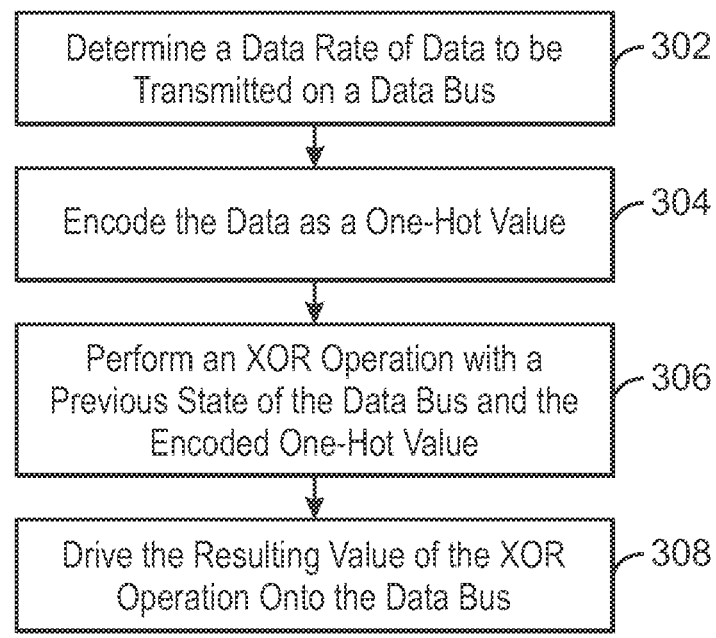
FIG. 3 is a process flow diagram of a method to enable transition minimized low speed data transmission.

FIG. 3 is a process flow diagram of a method 300 to enable transition minimized low speed data transmission. At block 302, a data rate of a set of data transmitted on a data bus is determined. At block 304, a one hot value is encoded from that data on the data bus in response to a low data rate. At block 306, an XOR operation is performed with a previous state of the data bus and the encoded one hot value. Additionally, at block 308 the resulting value is driven onto the data bus, transmitting a new state. In some cases, no clock signal is transmitted with the encoded data. In other words, the data is transmitted without the toggle of a clock to indicate the completion of transmission.

Figure 4:
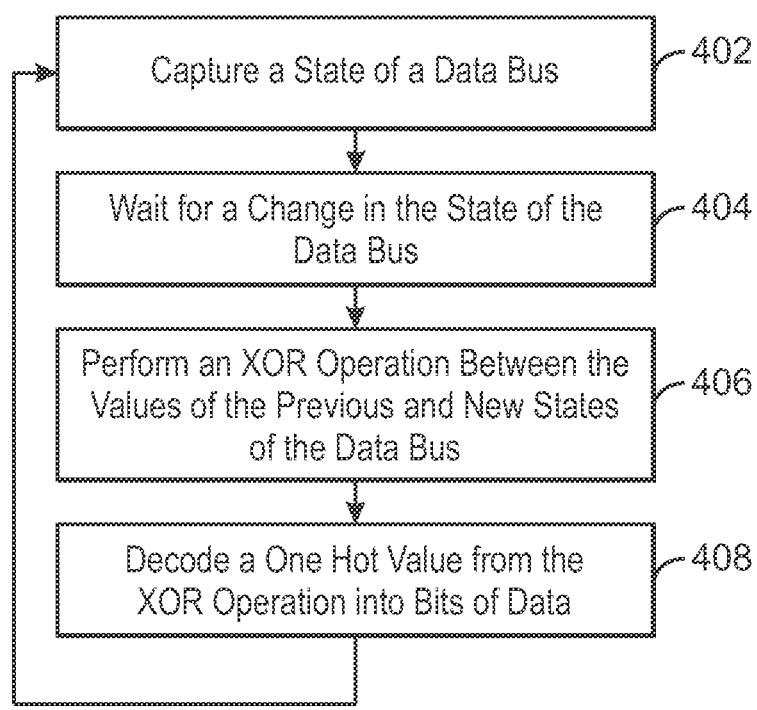
FIG. 4 is a process flow diagram of a method to enable reception of transition minimized low speed data transfer.

FIG. 4 is a process flow diagram of method 400 to enable transition minimized low speed data reception. At block 402, a state of a data bus is captured. At block 404, the receiver waits for a change in the state of the data bus. At block 406, an XOR operation is performed with the captured previous state of the data bus and the new state of the data bus. At block 408, the one hot value resulting from the XOR operation is decoded into bits of data. In some cases, the bits of data may be sent to a buffer. Process flow then returns to block 402 to capture the new state of the data bus and proceed to wait for a further change at block 404.

Consider the case of a source-synchronous double data rate (DDR) parallel data bus having eight data signals D[7:0], one data valid signal DV, and a clock signal CLK. Normal, full speed operation is identical to any standard DDR parallel bus. The data valid indication and data to be transmitted (TXDV and TXD[7:0]) are driven onto the bus signals DV and D[7:0], and after a fraction of the bus cycle time, the clock signal CLK will toggle (from high to low or from low to high). There is no power saving with normal operation. At low data rates (identified by the incoming TXDV pattern or known from other parameters), a modified bus coding scheme can be used to provide power savings.

The example of low data rate transmission shown avoids the need for the clock signal to toggle during low data rate transmission. However, most of the savings are made by using a modified data encoding. In some embodiments, the clock signal may be asynchronously extracted from the received data.

Continuing with the above example, transmissions may be broken down into three groups, each group containing three binary bits:
Group 1: TXDV, RXD7, RXD6
Group 2: RXD5, RXD4, RXD3
Group 3: RXD2, RXD1, RXD0

In this example, Group 1 has the value of 5, Group 2 will have the value of 0, and Group has the value of 3. Each group is submitted in turn to one-hot encoding to X[7:0]:
Group 1: TXDV, RXD7, RXD6=101b, X=00100000b=0x20
Group 2: RXD5, RXD4, RXD3=000b, X=00000001b=0x01
Group 3: RXD2, RXD1, RXD0=011b, X=00001000b=0x08

Above, the value for each group is shown in binary, a one-hot encoding, and hexadecimal representation of the one-hot encoding. The data bus contains 8 data signals are numbered 0 to 7 according to the standard manner. For Group 1, the initial bus value of 0, the data signal 5 (X=5) is changed to transmit a value of 5. For Group 2, the data signal 0 (X=0) is changed to transmit a value of 0. Finally, For Group 3, the data signal 3 (X=3) is changed to transmit a value of 3.

The one-hot value X is encoded as a change of the data bus by XORing it with the existing value of D[7:0] on the bus (initial value zero). The DV bit is left at zero, and in some cases the DV signal is used for some other function. The example below shows two sets of 8-bit data plus one valid bit being transmitted:
Initial value:D[7:0]=0x00
Group A1: TXDV, RXD7, RXD6=101b, X=00100000b=0x20, D[7:0]=0x20
Group A2: RXD5, RXD4, RXD3=000b, X=00000001b=0x01, D[7:0]=0x21
Group A3: RXD2, RXD1, RXD0=011b, X=00001000b=0x08, D[7:0]=0x29
Group B1: TXDV, RXD7, RXD6=110b, X=01000000b=0x40, D[7:0]=0x69
Group B2: RXD5, RXD4, RXD3=011b, X=00001000b=0x08, D[7:0]=0x61
Group B3: RXD2, RXD1, RXD0=111b, X=10000000b=0x80, D[7:0]=0xA9

The data within each group is encoded as a change rather than an exact value. Initially, all wires are off. With Group A, a wire five is high to indicate transmission of a five. Then wire zero is then asserted to indicate the transmission of a zero, while wire five remains asserted. Finally, the wire three is asserted while wires five and zero remain on to indicate the transmission of a three.

With Group B, a wire six is asserted to indicate transmission of a six while wires five, three and zero remain on. Then wire three is deasserted to indicate the transmission of a three, while wires six, five and zero remains on. Finally, the wire seven is asserted while wire six, five and zero remain on to indicate the transmission of a seven.

It thus takes three regular clock periods to send the same amount of data normally sent in one clock period. However, this is not a concern, the low data rate mode was chosen as it was known that it was sufficient for the data arriving for transmission by the transmitter. Had a greater data rate been required, the high-speed data rate would have automatically been selected The transmission efficiency of the standard (full-speed) and low-speed data rate schemes can illustrate the benefits of low rate transfer. In the standard scheme, for a random data stream, on average half the bits will change between one data word and the next. Assume that the data valid bit changes rarely. The DDR clock will change for each data word. Therefore, in a standard scheme, for every 8-bits of data sent, there will be, on average (including the clock), five data bus signals that change.

In a low data rate scheme, there is by definition always and only one parallel bus bit signal that changes with each group processed. There are three groups sent for every 8-bits of data (and data valid bit), therefore, in the low data rate scheme, for every 8-bits of data sent, there will be three parallel bus signals that change.

For both schemes, every second time a parallel bus signal changes value, the change will be from low-to-high (zero to one), requiring energy from the supply rail. We can therefore calculate relative efficiencies by comparing relative signal change rates without concerning ourselves as to whether these are low-to-high changes or high-to-low changes. For the same data, the low data rate scheme has only 60% of the transitions of the standard scheme. Therefore, the low data rate scheme requires only 60% of the energy to send this data, compared to sending the same data using the standard scheme.

As noted above, an advantage of the low data rate scheme is that there is no need for the bus clock to be running. For a standard scheme, this would be fatal, as standard schemes must be protected against the skew in arrival time of the various data bits caused by silicon and PCB variations. The low data rate scheme uses a one-hot with XOR scheme, where only one data bit changes at a time, and is thus immune to skew effects for the same reason that gray code techniques are immune to such effects.

In embodiments, a slightly different scheme could be implemented whereby the data valid signal is used to differentiate between full and low-data rate modes. In this scheme, the indication of full or low rate is a function of whether or not the DV signal is asserted on the first cycle where data changes (the one-hot encoding of low data rate will be chosen such that the if the DV signal is part of the data bus changed by the one-hot scheme, it will never be asserted for low data rate encodings where the data valid indication to be transmitted is high). Likewise, low data rate encoding will be deemed to stop once a data transfer is sent with data valid indication low. Such a scheme would be suitable in cases where it is undesirable to use the presence or absence of bus clock to differentiate between full and low-data rate modes, such as in cases of common clock buses or within a SoC.

Moreover, the present techniques can be applied to differing width buses. For example, up to 11 bits of data and one data valid signal can be carried by four cycles of 3-to-8 one-hot encoding onto the bottom 8 data bits. Sixteen (16) bits of data without data valid can be carried with four cycles of 4-to-8 one-hot encoding, etc.

Figure 5:
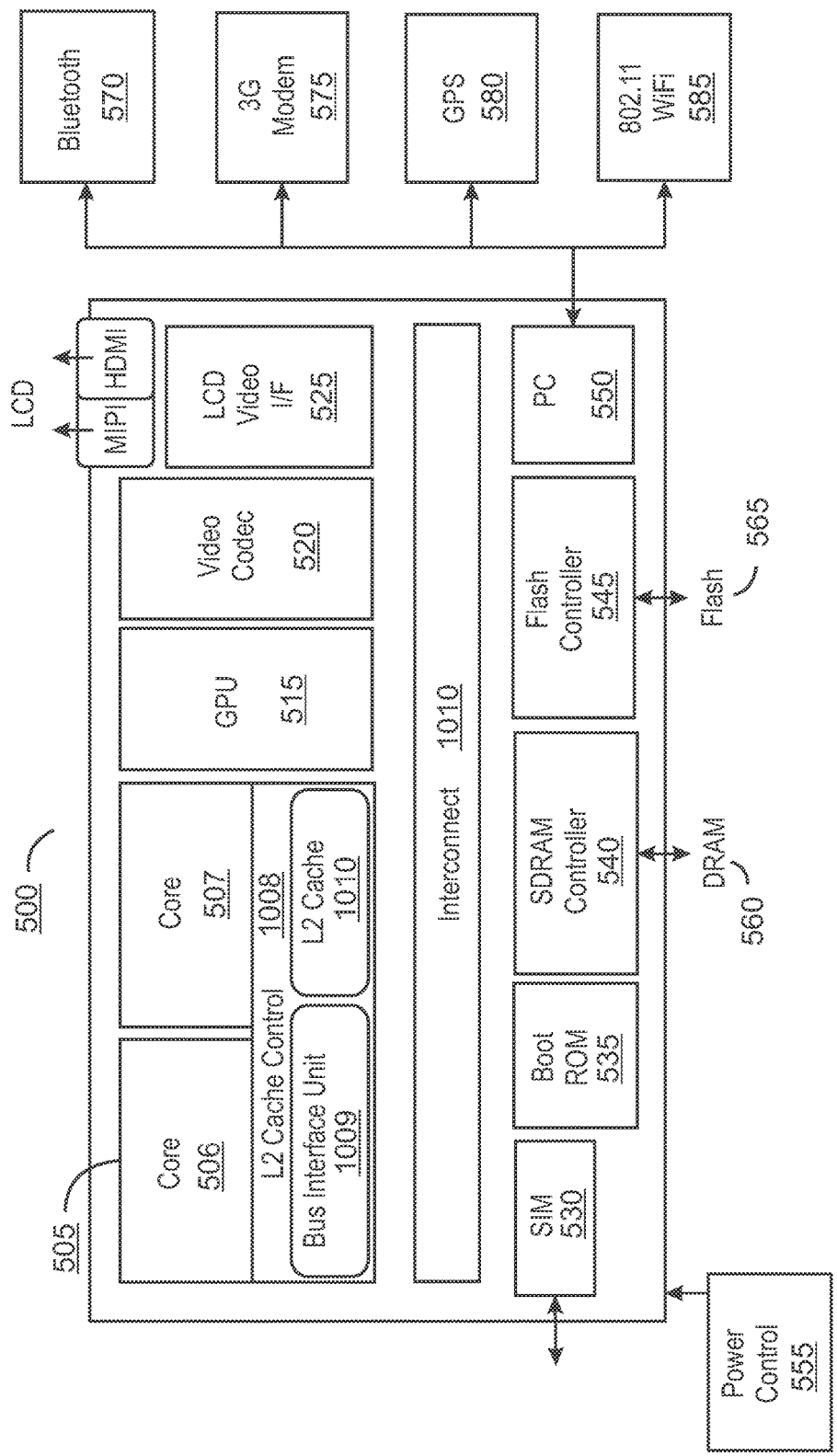
FIG. 5 is an embodiment of a system on-chip (SOC) design in accordance with the present techniques.

Turning next to FIG. 5, an embodiment of a system on-chip (SOC) design in accordance with the present techniques is depicted. As a specific illustrative example, SOC 500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 500 includes 2 cores—506 and 507. Similar to the discussion above, cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 508 that is associated with bus interface unit 509 and L2 cache 510 to communicate with other parts of system 500. Interconnect 510 includes an on-chip interconnect, such as an IOSF, AMBA, or other interconnect discussed above, which potentially implements one or more aspects of the described present technique.

Interface 510 provides communication channels to the other components, such as a Subscriber Identity Module (SIM) 530 to interface with a SIM card, a boot ROM 535 to hold boot code for execution by cores 506 and 507 to initialize and boot SOC 500, a SDRAM controller 540 to interface with external memory (e.g. DRAM 560), a flash controller 545 to interface with non-volatile memory (e.g. Flash 565), a peripheral control Q1650 (e.g. Serial Peripheral Interface) to interface with peripherals, video codecs 520 and Video interface 525 to display and receive input (e.g. touch enabled input), GPU 515 to perform graphics related computations, etc. Any of these interfaces may incorporate aspects of the present technique described herein. Specifically, interconnect 510, the connection to peripherals, or the peripherals themselves may benefit from the proposed scheme described above.

In addition, the system illustrates peripherals for communication, such as a Bluetooth module 570, 3G modem 575, GPS 585, and WiFi 585. Note as stated above, a UE includes a radio for communication. As a result, these peripheral communication modules are not all required. However, in a UE some form a radio for external communication is to be included.

Example 1

A method for transition minimized low speed data transfer is described herein. The method includes determining a data rate of a set data transmitted on a data bus and encoding a one hot value in response to a low data rate. The method also includes performing an XOR operation with a previous state of the data bus and the encoded one hot value, and driving a resulting value of the XOR operation onto the data bus.

No clock signal is transmitted with the encoded data. The set of data may be transmitted on a high speed data bus using less energy when compared to sending the same data at full rate data on the high speed data bus. Additionally, the low speed data transfer may be automatically selected based on the data rate. The transition minimized the low speed data transfer may be used with on-chip interfaces. Further, the data bus is a high speed data bus of any width. A data valid signal may be used to differentiate between full and low-data rate modes of data transfer.

Example 2

A method for transition minimized low speed data transfer is described herein. The method includes capturing a state of a data bus and performing an XOR operation with the state of the data bus and a current state of the data bus. The method also includes decoding a one hot value from the XOR operation into bits of data.

No clock signal is received on the data bus. Data may be received on a high speed data bus uses less energy when compared to full rate data on the high speed data bus. Additionally, the low speed data transfer may be automatically based on a change in the bus state after period of time passes from capturing the state of the data bus. The transition minimized the low speed data transfer may also be used with on-chip interfaces. Further, the decoded data may be place into a first in first out buffer. The data valid signal may also be used to differentiate between full and low-data rate modes Example 3

A system for transition minimized low speed data transfer is described herein. The system includes a transmitter and a high speed data bus. The transmitter may encode data into a one-hot value and XOR the one hot value with a state of the high speed data bus. Subsequent data for transmission is detected by a change on the high speed data bus without the use of a clock signal.

The one-hot value may indicate a group of bits with a single high bit and all other bits are low. The XOR operation may be a non-return-to-zero line code. The low data rate transmission may avoid the need for the clock signal to toggle during low data rate transmission. The data valid signal may be used to differentiate between full and low-data rate modes Further, the high speed data bus may be of any width. The transition minimized the low speed data transfer may be used with on-chip interfaces. Further, the same data bus may be used for both transmission-minimized low-speed and full-speed data transfer. A subset of the full-speed data bus can be used for transmission-minimized low-speed data transfer. Additionally, the use of a modified coding scheme for bus data transfer may result in lower peak bus charging energies.

While the present technique has been described with respect to a limited number of embodiments, those skilled in the art will appreciate numerous modifications and variations therefrom. It is intended that the appended claims cover all such modifications and variations as fall within the true spirit and scope of this present technique.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present technique.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the present technique may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present technique. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present technique as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Moreover, the foregoing describes the use of a 1-hot XOR coding scheme to minimize transitions. However, other approaches, such as 2-hot XOR or a combination of compression and coding techniques may be used to give varying ratios of low to high-speed data transfer.

What is claimed is:

1. A system for transition minimized low speed data transfer, comprising:
   a transmitter; and
   a high speed data bus, wherein the high speed data bus is used for both transmission-minimized low-speed transfer and full-speed data transfer and wherein the transmitter encodes:
   a first group of data from the high speed data bus into a one-hot value and XOR's the one hot value with a previous value on the high speed data bus;
   a next group of data from the high speed data bus into a next one-hot value and XOR's the one hot value with a previous value on the high speed data bus; and
   a final group of data from the high speed data bus into a final one-hot value and XOR's the one hot value with a previous value on the high speed data bus, wherein subsequent data for transmission is detected by a change on the high speed data bus without the use of a clock signal.

2. The system of claim 1, wherein the one-hot value indicates a group of bits with a single high bit and all other bits are low.

3. The system of claim 1, wherein the XOR operation is a non-return-to-zero line code.

4. The system of claim 1, wherein the low data rate transmission avoids the need for the clock signal to toggle during low data rate transmission.

5. The system of claim 1, wherein a data valid signal is used to differentiate between full and low-data rate modes.

6. The system of claim 1, wherein the high speed data bus is of any width.

7. The system of claim 1, wherein the transition minimized low speed data transfer is used with on-chip interfaces.

8. The system of claim 1, wherein a subset of the full-speed data bus is used for transmission-minimized low-speed data transfer.

9. The system of claim 1, wherein the use of a modified coding scheme for bus data transfer results in lower peak bus charging energies.

10. A method for transition minimized low speed data transfer, comprising:
    determining a data rate of a set of data transmitted on a data bus;
    encoding a one hot value of a first group of data from the data bus in response to a low data rate, wherein a data valid signal is used to differentiate between full and low-data rate modes of data transfer, and wherein the one-hot value and a previous value on the data bus are subject to an XOR operation and driving a resulting value of the XOR operation onto the data bus; and
    encoding another one hot value of a second group of data from the data bus in response to a low data rate, wherein the another one-hot value and another previous value on the data bus are subject to another XOR operation and driving a second resulting value of the another XOR operation onto the data bus.

11. The method of claim 10, wherein no clock signal is transmitted with the encoded one hot value.

12. The method of claim 10, wherein the set of data is transmitted on a high speed data bus using less energy when compared to sending the same data as full rate data on the high speed data bus.

13. The method of claim 10, wherein the low speed data transfer is automatically selected based on the data rate.

14. The method of claim 10, wherein the transition minimized low speed data transfer is used with on-chip interfaces.

15. The method of claim 10, wherein the data bus is a high speed data bus of any width.

16. The method of claim 10, wherein the transition minimized low speed data transfer enables data to be transmitted using less energy when compared with a standard transmission scheme.

17. A method for transition minimized low speed data transfer, comprising:

capturing a previous state of a data bus;
performing an XOR operation with the previous state of the data bus and a current state of the data bus;
decoding a one hot value from the XOR operation into a first group of bits of data;
capturing a next previous state of the data bus;
performing a second XOR operation with the next previous state of the data bus and a next current state of the data bus; and
decoding a second one hot value from the second XOR operation into a second group of bits of data.

18. The method of claim 17, wherein no clock signal is received on the data bus.

19. The method of claim 17, wherein data is received on a high speed data bus and uses less energy when compared to full rate data on the high speed data bus.

20. The method of claim 17, wherein the low speed data transfer is automatically based on a change in the bus state after a period of time passes from capturing the state of the data bus.

21. The method of claim 17, wherein the transition minimized low speed data transfer is used with on-chip interfaces.

22. A tangible, machine-readable medium comprising code that, when executed, causes a processor to:
   determine a data rate of a set of data transmitted on a data bus, wherein the data bus is used for both transmission-minimized low-speed transfer and full-speed data transfer;
   encode a one hot value of a first group of data from the data bus in response to a low data rate, wherein the one-hot value and a previous value on the data bus are subject to an XOR operation and driving a resulting value of the XOR operation onto the data bus; and
   encode another one hot value of a second group of data from the data bus in response to a low data rate, wherein the another one-hot value and another previous value on the data bus are subject to another XOR operation and driving a second resulting value of the another XOR operation onto the data bus.

23. The tangible, machine-readable medium of claim 22, wherein no clock signal is transmitted with the encoded one hot value.

* * * * *